Figure 1:
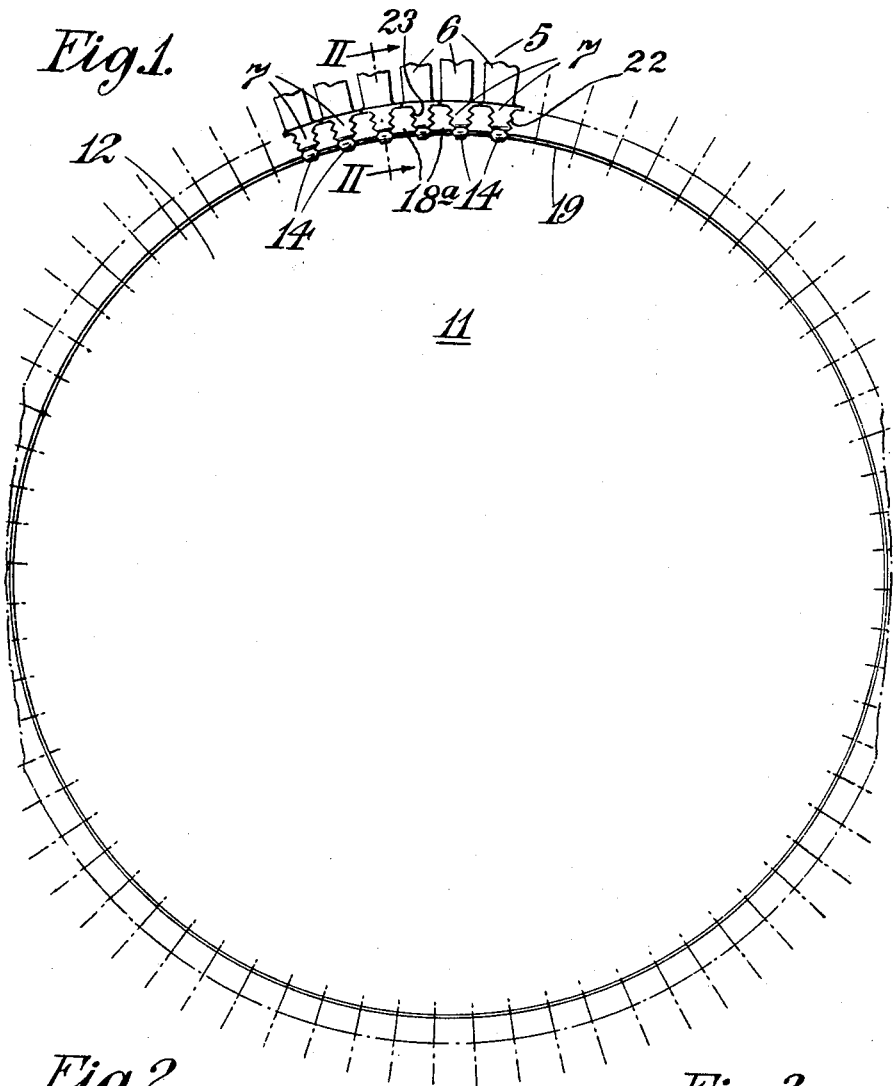

July 17, 1956

P. P. HILL 2,755,062

BLADE-LOCKING MEANS FOR TURBINE
AND THE LIKE ROTOR ASSEMBLIES

Filed June 30, 1952

2 Sheets-Sheet 1

INVENTOR
P. P. HILL
BY Wilkinson & Mawhinney
ATTYS.

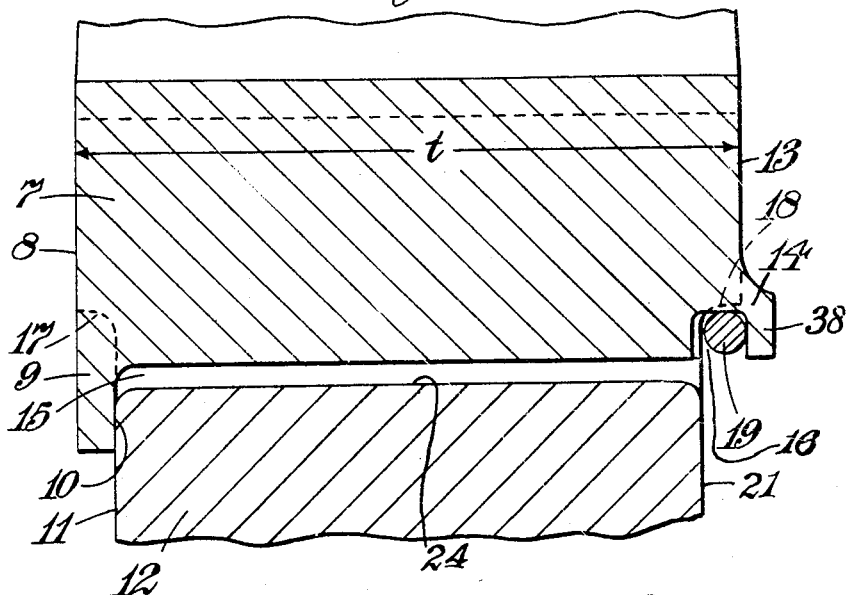
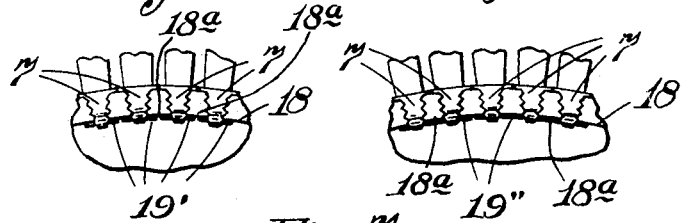
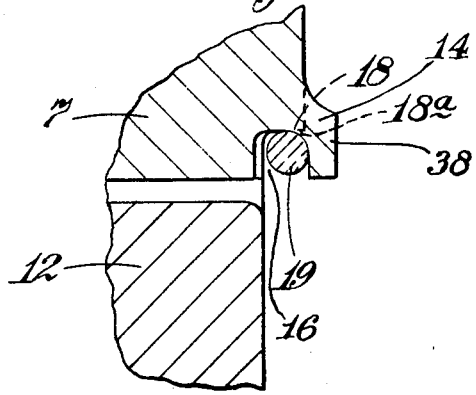

United States Patent Office 2,755,062
Patented July 17, 1956

2,755,062

BLADE-LOCKING MEANS FOR TURBINE AND THE LIKE ROTOR ASSEMBLIES

Philip Predy Hill, Winterbourne, Bristol, England, assignor to The Bristol Aeroplane Company Limited, Bristol, England, a British company Application June 30, 1952, Serial No. 296,292

Claims priority, application Great Britain July 13, 1951

4 Claims. (Cl. 253—77)

This invention relates to means for locking the blades in position in turbine and the like rotor assemblies of the kind comprising a disc-like rotor element having opposed faces and a plurality of open-ended uniform cross-section slots in its rim, the slots extending from one of said faces to the other of said faces and having side walls which are undercut to provide at least one inwardly directed abutment face on each side wall, and a plurality of blades, one for each slot, each blade having a root portion, engaged in the slot.

According to the invention, in such an assembly the blades are locked against movement along the slots in at least one direction by arcuate portions of wire lying against the end face of the rotor element and bridging the blade-root slots, such bridging parts being each housed in an opening in a part of the corresponding blade root extending beyond the end face of the rotor element at that radius, and the openings being closed laterally on the side of the wire remote from said rotor end face, so that the wire would be placed in shear at the ends of the openings by a movement of the blades along the slots. The portions of wire form a continuous ring with one or more pairs of abutting ends.

In a preferred arrangement the openings in the blade roots are in the form of outwardly extending grooves bounded on the side of the wire remote from said rotor end face by a lip adapted for peening to trap the wire in the groove. Such peening need only be slight and may be released and repeated for repair and overhaul purposes several times without damage to the blades.

To support the portions of wire between the blade root grooves against displacement by centrifugal force the rotor element may be provided with a shoulder abutting the outside periphery of the wire ring. The portions within the blade roots may be similarly supported by making the outer diameter of the grooves equal to that of the shoulder.

The locking system according to the invention is preferably used to restrain the blades against movement in the direction opposite to the normal thrust only, movement in the thrust direction being prevented by a shoulder on the blade root engaging the opposite face of the rotor element to that against which the locking wire portions lie.

The wire may be of circular or other cross-sectional form and is preferably of nickel-chromium steel alloy or other hard metal capable of withstanding the temperatures to be encountered while maintaining adequate shear strength.

Figure 2:
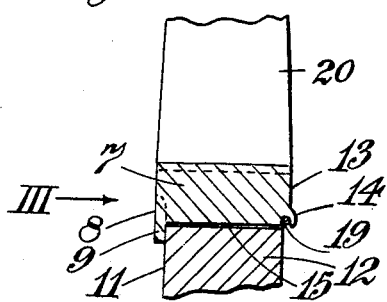
Figure 3:
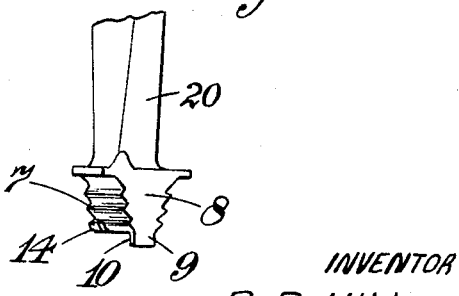

A practical construction of turbine rotor assembly in accordance with this invention will now be described, by way of example only, with reference to the accompanying drawings wherein:

Figure 1 is an end view of the rotor assembly,
Figure 2 is a section on the line II—II of Figure 1,
Figure 3 is a perspective view, showing the root of one blade, as seen in the direction of arrow III of Figure 2,
Figure 4 is a view similar to Figure 2, to a larger size, showing the several parts of the assembly in greater detail and prior to the wire being locked in position, and
Figures 5, 6 and 7 are views showing details of construction of alternative arrangements.

The assembly (generally indicated at 5) comprises a disc-like rotor element 12 having opposed faces 11, 21 and a plurality of open-ended uniform serrated cross-sectional slots 15 in its rim, the slots 15 extending from the face 11 to the face 21 of the rotor element and each having side walls 22 which are undercut to provide inwardly directed abutment faces 23 on the side walls 22. Each of the blades 6 has a working portion 20 and a "fir tree" root portion 7 serrated on each of two opposite sides. On their upstream side 8 (Figure 2) the root portions 7 are provided at their tips with a lip or flange 9 depending from the root portion and extending inwardly towards the rotor axis and providing a shoulder 10 which butts against the upstream face 11 of the rotor element 12 when the blades are pushed fully into their slots 15 from the upstream side. The lips 9 prevent movement of the blades 6 in the thrust direction relatively to the rotor element 12. On the downstream side 13 which side, like the side 8 is flat and arranged substantially normal to the serrated sides of the root portion the roots 7 are provided at their tips with an axial extension or axially projecting part 14 and the projection 14 having a downwardly extending lip 38 defining with the root 7 an open ended circumferential groove 16 (Figure 4) having its open side towards the rotor axis, the downwardly extending lip 38 actually forming the downstream side of the groove and being in the form of a comparatively thin lip. The slots 15 are formed mainly in a thickened rim of the element 12, the rim having an axial thickness indicated by the dimension $t$ in Figure 4. The inner parts including the floors 24 of the slots, however, are formed in the element 12 proper, that is to say, the slots extend radially inwardly of the rotor element to an extent greater than the radial thickness of the rim on the rotor element. Thus the rim of the rotor element projects axially on each side of the rotor element on the side adjacent the lips 9 by the thickness of these lips and on the side adjacent the grooves 16 by the width of the grooves 16. The main part of the blade roots have an axial thickness $t$ and the upstream sides 8 of the blade roots lie flush with the upstream face of the rim of the rotor element 12, the lips 9 projecting radially inwardly from the radially inwardly directed annular face 17 bounding the inner periphery of the part of the rim which projects axially on the same side of the element 12 as the lips 9 lie. On the other side of the element 12, the projecting parts 14 of the blade roots 7 forming the downstream sides of the grooves 16 lie radially inwardly from the radially inwardly directed face 18 bounding the inner periphery of the part of the rim which projects axially on the same side of the element 12 as the grooves 16 lie. The face 18 is interrupted by the slots 15 and provides a radially inwardly directed shoulder 18a between each pair of slots, or put another way, a pair of radially inwardly directed shoulders 18a one on each side of each slot. A piece of circular section stainless steel (e. g. nickel-chromium steel alloy) wire 19 of thickness substantially equal to the width of the groove 16 is bent into the form of a ring of outer diameter substantially equal to that of the grooves and is expanded into the latter.

After the wire 19 is positioned as shown in Figure 4 the parts 14 are peened, as shown in Figure 2, to trap the wire in the grooves. Such peening is only slight so that it may be released and repeated for repair and overhaul several times without damage to the blades.

Instead of the wire 19 being in one piece as shown in Figure 1 it may be in several pieces, either a piece of wire 19' for each blade (Figure 5) or a piece of wire 19" for two or more blades (Figure 6).

By arranging that the radially inwardly directed annular face 18, providing the shoulders previously mentioned, be of the same diameter as the ring of wire 19 of Figure 1 (as shown in Figure 7) the outside periphery of the portions of wire between the grooves 16 is supported against displacement by centrifugal force by the shoulders, the shoulders abutting the wire and being located radially outwardly of the wire. Also as shown in Figure 7, the outer diameter of the grooves 16 is equal to the diameter of the face 18 so that the wire is similarly supported within the roots 7 as is also done in the arrangement of Figure 1.

I claim:

1. A bladed rotor assembly for an axial flow rotary power conversion machine comprising a rotor element having opposed faces and at least one open-ended uniform cross-section slot in its rim, said slot passing from one of said faces to the other of said faces and having side walls which are undercut to provide at least one inwardly directed abutment face on each side wall; at least one blade having a root portion, and a working portion extending from said root portion, said blade being mounted on said rotor element with its root portion received in said slot, said root portion being shaped so that it engages said abutment faces to prevent movement of said blade outward of said rotor element; said root portion also having a shoulder engaging one of said faces of said rotor element to prevent movement of said blade along said slot in the direction in which thrust is applied to the blade during operation of the rotor assembly, said root portion further having a projecting part projecting beyond the other of said faces of said rotor element, said projecting part being formed with an inwardly directed lip and an outwardly extending open-ended groove bounded on its side remote from the rotor by said lip; and a portion of wire extending across said slot and trapped in said groove by said lip, the wire contacting said other face of said rotor element and said groove to prevent movement of said blade along said slot in the direction opposite to that in which thrust is applied to the blade during operation of the rotor assembly.

2. A bladed rotor assembly as claimed in claim 1 wherein said other of said faces further comprises a pair of axially extending shoulders one on each side of said slot, said pair of shoulders abutting said portion of wire and being located radially outwardly thereof.

3. For use with a rotor element having opposed faces and at least one open ended uniform serrated cross-sectional slot in its rim extending from one face to the other, and a locking wire; a turbine blade comprising a prismatic root portion serrated on at least one side and having at least one other flat side, the serrations on said one side of said root portion being adapted to be received in the serrations in the serrated slot of said rotor element, a flange depending from the side of the root portion of said blade opposite said other side of said root portion, and a projecting part extending axially from said root portion from said other side thereof, said projecting part having a radially inwardly extending lip defining with said root portion an open-ended groove positioned so as to be adapted to lie across one end of said serrated slot of the rotor element when said root portion is received in the slot, said open-ended groove being adapted to receive therewithin a segment of said locking wire.

4. For use with a rotor element having opposed faces and at least one open-ended uniform serrated cross-sectional slot in its rim extending from one face to the other, a turbine blade comprising a root portion serrated on at least one side and having at least one other flat side, the serrations on said one side being adapted to be received in the serrations in the serrated slot of said rotor element, a flange depending from the side of the root portion of said blade opposite said other side of said root portion, a projecting part extending axially from said blade root portion from said other side thereof, said projecting part having a radially inwardly extending lip defining between said body and root portion an open-ended groove, and a segment of locking wire, an intermediate portion of which is adapted to be received within said open-ended groove with two further portions of the wire, one on each side of said intermediate portion, projecting one from one end of the groove and the other from the other end of the groove.

References Cited in the file of this patent

UNITED STATES PATENTS

| 1,072,457 | Herr | Sept. 9, 1913 |

FOREIGN PATENTS

| 341,486 | France | June 11, 1904 |
| 976,790 | France | Nov. 1, 1950 |